(12) United States Patent
Ju et al.

(10) Patent No.: US 9,681,055 B2
(45) Date of Patent: *Jun. 13, 2017

(54) PREVIEW SYSTEM FOR CONCURRENTLY DISPLAYING MULTIPLE PREVIEW IMAGES GENERATED BASED ON INPUT IMAGE GENERATED BY IMAGE CAPTURE APPARATUS AND RELATED PREVIEW METHOD THEREOF

(71) Applicant: MEDIATEK INC., Hsin-Chu (TW)

(72) Inventors: Chi-Cheng Ju, Hsinchu (TW); Ding-Yun Chen, Taipei (TW); Cheng-Tsai Ho, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,002

(22) Filed: Oct. 17, 2016

(65) Prior Publication Data

US 2017/0034448 A1    Feb. 2, 2017

Related U.S. Application Data

(63) Continuation of application No. 13/868,072, filed on Apr. 22, 2013, now Pat. No. 9,503,645.

(Continued)

(51) Int. Cl.
*H04N 5/232* (2006.01)
*G06T 3/40* (2006.01)
(Continued)

(52) U.S. Cl.
CPC .......... *H04N 5/23293* (2013.01); *G06T 3/40* (2013.01); *G06T 3/4007* (2013.01);
(Continued)

(58) Field of Classification Search
None
See application file for complete search history.

(56) References Cited

U.S. PATENT DOCUMENTS

| 4,733,300 A | 3/1988 | Sugiyama |
| 6,058,248 A | 5/2000 | Atkins |

(Continued)

FOREIGN PATENT DOCUMENTS

| CN | 101115148 A | 1/2008 |
| CN | 101149462 A | 3/2008 |

(Continued)

*Primary Examiner* — Roberto Velez
*Assistant Examiner* — Cynthia Segura
(74) *Attorney, Agent, or Firm* — Winston Hsu

(57) ABSTRACT

A preview system of an image capture apparatus has a processing circuit and a display apparatus. The processing circuit reads an input image, scales at least a portion of the input image to generate a first preview image, and derives a second preview image from a selected portion of the input image. The display apparatus displays the first preview image and the second preview image, concurrently. Besides, a preview method for an image capture apparatus includes at least the following steps: reading an input image; scaling at least a portion of the input image to generate a first preview image; deriving a second preview image from a selected portion of the input image; and displaying the first preview image and the second preview image on a display apparatus, concurrently.

10 Claims, 10 Drawing Sheets

Related U.S. Application Data

(60) Provisional application No. 61/651,499, filed on May 24, 2012.

(51) Int. Cl.
   *G06T 5/00*    (2006.01)
   *H04N 9/79*    (2006.01)
   *H04N 5/77*    (2006.01)
   *G06T 7/00*    (2017.01)

(52) U.S. Cl.
   CPC ............ *G06T 3/4023* (2013.01); *G06T 5/003* (2013.01); *G06T 7/0002* (2013.01); *H04N 5/23222* (2013.01); *H04N 5/23248* (2013.01); *H04N 5/23254* (2013.01); *H04N 5/772* (2013.01); *H04N 9/79* (2013.01); *G06T 3/4053* (2013.01); *G06T 2207/10016* (2013.01); *G06T 2207/20192* (2013.01); *G06T 2207/30168* (2013.01); *G06T 2207/30201* (2013.01)

(56) References Cited

U.S. PATENT DOCUMENTS

| | | | |
|---|---|---|---|
| 6,888,574 | B1 | 5/2005 | Asakura |
| 6,930,752 | B2 | 8/2005 | Baba |
| 7,269,300 | B2 | 9/2007 | Braun |
| 7,545,391 | B2 | 6/2009 | Le Dinh |
| 8,294,748 | B2 | 10/2012 | Stec |
| 8,373,802 | B1 | 2/2013 | Gross |
| 8,736,736 | B2 | 5/2014 | Hoshino |
| 8,787,728 | B2 | 7/2014 | Maruyama |
| 8,848,090 | B2 | 9/2014 | Koguchi |
| 9,001,255 | B2 | 4/2015 | Matsuzawa |
| 9,503,645 | B2 * | 11/2016 | Ju .................... H04N 5/23222 |
| 2001/0012072 | A1 | 8/2001 | Ueno |
| 2002/0056083 | A1 * | 5/2002 | Istvan ................. G06F 3/0481 725/1 |
| 2003/0160886 | A1 | 8/2003 | Misawa |
| 2005/0089247 | A1 | 4/2005 | Braun |
| 2006/0139376 | A1 | 6/2006 | Le Dinh |
| 2006/0280427 | A1 | 12/2006 | Snowdon |
| 2006/0290796 | A1 | 12/2006 | Nikkanen |
| 2007/0098396 | A1 | 5/2007 | Watanabe |
| 2007/0140675 | A1 | 6/2007 | Yanagi |
| 2008/0024643 | A1 | 1/2008 | Kato |
| 2008/0129854 | A1 | 6/2008 | Onoda |
| 2008/0240563 | A1 | 10/2008 | Takano |
| 2008/0259274 | A1 | 10/2008 | Chinnock |
| 2008/0304745 | A1 | 12/2008 | Honma |
| 2009/0009652 | A1 | 1/2009 | Sudo |
| 2009/0122079 | A1 * | 5/2009 | Nishioka ............... G06F 3/0481 345/619 |
| 2009/0213263 | A1 | 8/2009 | Watanabe |
| 2009/0284585 | A1 | 11/2009 | Tsai |
| 2010/0110300 | A1 | 5/2010 | Ueno |
| 2010/0173678 | A1 | 7/2010 | Kim |
| 2010/0215348 | A1 | 8/2010 | Saito |
| 2011/0018970 | A1 | 1/2011 | Wakabayashi |
| 2011/0084962 | A1 | 4/2011 | Kim |
| 2011/0141486 | A1 | 6/2011 | Wada |
| 2011/0149029 | A1 | 6/2011 | Kellerman |
| 2011/0158623 | A1 | 6/2011 | Cheng |
| 2011/0301980 | A1 | 12/2011 | Martucci |
| 2011/0311147 | A1 | 12/2011 | Pahalawatta |
| 2012/0019677 | A1 | 1/2012 | Wong |
| 2012/0268641 | A1 | 10/2012 | Kazama |
| 2012/0293396 | A1 * | 11/2012 | Sako .................... H04N 13/044 345/8 |
| 2013/0002814 | A1 | 1/2013 | Park |
| 2013/0033615 | A1 | 2/2013 | Ecrement |
| 2013/0106913 | A1 | 5/2013 | Edmiston |
| 2013/0194395 | A1 | 8/2013 | Hannuksela |
| 2013/0300900 | A1 | 11/2013 | Pfister |
| 2016/0119547 | A1 * | 4/2016 | Kobayashi ......... H04N 5/23293 348/333.11 |

FOREIGN PATENT DOCUMENTS

| | | |
|---|---|---|
| CN | 101266650 A | 9/2008 |
| CN | 102096464 A | 6/2011 |
| CN | 102317974 A | 1/2012 |
| CN | 102375992 A | 3/2012 |
| EP | 0874330 A2 | 10/1998 |
| TW | 200947355 A | 11/2009 |

* cited by examiner

PREVIEW SYSTEM FOR CONCURRENTLY DISPLAYING MULTIPLE PREVIEW IMAGES GENERATED BASED ON INPUT IMAGE GENERATED BY IMAGE CAPTURE APPARATUS AND RELATED PREVIEW METHOD THEREOF

CROSS REFERENCE TO RELATED APPLICATION

This is a continuation of U.S. application Ser. No. 13/868,072 filed on Apr. 22, 2013, which claims the benefit of U.S. provisional application No. 61/651,499 filed on May 24, 2012. The entire contents of U.S. application Ser. No. 13/868,072 and U.S. provisional application No. 61/651,499 are incorporated herein by reference.

BACKGROUND

The disclosed embodiments of the present invention relate to an image preview technique, and more particularly, to a preview system for concurrently displaying multiple preview images generated based on an input image generated by an image capture apparatus and related preview method thereof.

Camera modules have become popular elements used in a variety of applications. For example, a smartphone is typically equipped with a camera module, thus allowing a user to easily and conveniently take pictures by using the smartphone. In general, the smartphone has a display screen which can display a preview image obtained via the camera module before the user actually touches a shutter/capture button. Due to development of the camera module, the camera resolution/capture resolution of the camera module on the smartphone may be higher than the display resolution of the display screen of the smartphone. As a result, the image resolution of each captured image generated by the camera module is higher than the display resolution of the display screen. Hence, due to the resolution discrepancy, the display screen is unable to show all of the details originally present in the captured image generated by the camera module under the preview mode. According to the conventional design, the preview image displayed on the display screen is generally a down-scaled version of the captured image generated by the camera module under the preview mode. Therefore, the preview image would lack certain details originally present in the captured image. Besides, it is possible that a down-scaled version (e.g., a preview image) of the captured image looks fine when displayed on a lower-resolution display screen (e.g., the display screen of the smartphone), but the captured image looks blurry when displayed on a higher-resolution display screen (e.g., a display screen of a personal computer). Therefore, when viewing the preview image displayed on the lower-resolution display screen, the user is unable to know what detail will be actually captured by the higher-resolution camera module.

Thus, there is a need for an innovative camera preview design which is capable of assisting the user to know what detail will be actually captured.

SUMMARY

In accordance with exemplary embodiments of the present invention, a preview system for concurrently displaying multiple preview images generated based on an input image generated by an image capture apparatus and related preview method thereof are proposed to solve the above-mentioned problem.

According to a first aspect of the present invention, an exemplary preview system of an image capture apparatus is disclosed. The exemplary preview system includes a processing circuit and a display apparatus. The processing circuit is arranged for reading an input image, scaling at least a portion of the input image to generate a first preview image, and deriving a second preview image from a selected portion of the input image. The display apparatus is arranged for displaying the first preview image and the second preview image, concurrently. Each of the first preview image and the second preview image is displayed while a trigger signal is generated by an input device of the image capture apparatus. When the trigger signal indicates a first status, a first mode is active. When the trigger signal indicates a second status following the first status, a second mode is active. Each of the first preview image and the second preview image is displayed during the first mode. When the trigger signal is not generated and none of the first mode and the second mode is active, the first preview image and the second preview image are both displayed on the display apparatus with a display size of the first preview image being larger than a display size of the second preview image. While the trigger signal is generated to indicate the first status, the display size of the second preview image is increased under the first mode.

According to a second aspect of the present invention, an exemplary preview method for an image capture apparatus is disclosed. The exemplary preview method includes: reading an input image; scaling at least a portion of the input image to generate a first preview image; deriving a second preview image from a selected portion of the input image; and displaying the first preview image and the second preview image on a display apparatus, concurrently. Each of the first preview image and the second preview image is displayed while a trigger signal is generated by an input device of the image capture apparatus. When the trigger signal indicates a first status, a first mode is active. When the trigger signal indicates a second status following the first status, a second mode is active. Each of the first preview image and the second preview image is displayed during the first mode. When the trigger signal is not generated and none of the first mode and the second mode is active, the first preview image and the second preview image are both displayed on the display apparatus with a display size of the first preview image being larger than a display size of the second preview image. While the trigger signal is generated to indicate the first status, the display size of the second preview image is increased under the first mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to use a multi-preview scheme (e.g., a dual-preview scheme) to allow the user to have an overview of an image to be captured and a detailed view of a selected region within the image to be captured. With the help of the detailed view of the selected region within the image to be captured, the user can exactly know what detail of the selected region is going to be captured by an image capture apparatus. In this way, user experience of using a portable device equipped with image capture functionality (e.g., a smartphone equipped with a camera module, or a digital camera) is enhanced greatly. Technical features of the proposed preview scheme are detailed as below.

Figure 1:
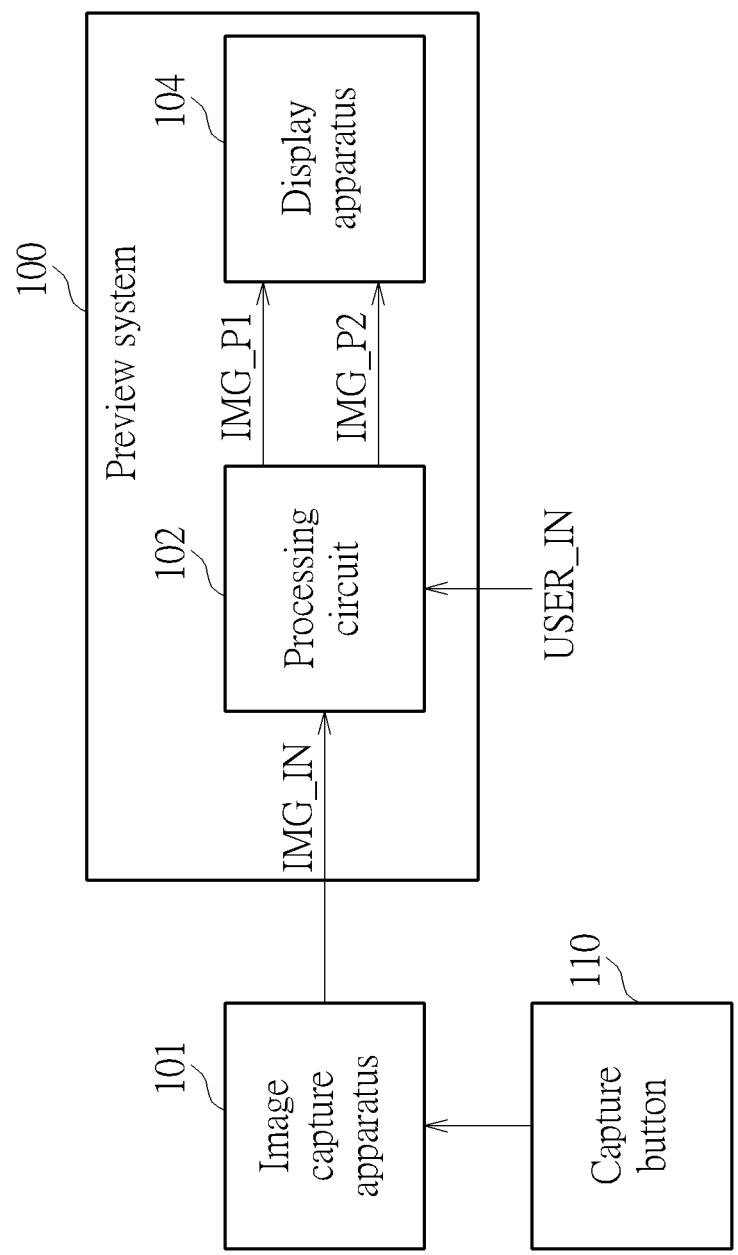
FIG. 1 is a block diagram illustrating a preview system according to an exemplary embodiment of the present invention.

FIG. 1 is a block diagram illustrating a preview system according to an exemplary embodiment of the present invention. The preview system 100 is active when an image capture apparatus 101 is operating under a preview/capture mode. In one exemplary design, the preview system 100 and the image capture apparatus 101 are both disposed on a portable device such as a smartphone or a digital camera. As shown in FIG. 1, the preview system 100 includes a processing circuit 102 and a display apparatus 104. The processing circuit 102 is coupled to the image capture apparatus 101 and the display apparatus 104, and arranged for reading an input image IMG_IN generated from the image capture apparatus 101 under the preview/capture mode, scaling at least a portion (i.e., part or all) of the input image IMG_IN to generate a first preview image IMG_P1, and deriving a second preview image IMG_P2 from a selected portion of the input image IMG_IN. It should be noted that both of the first preview image IMG_P1 and the second preview image IMG_P2 are generated based on the same input image IMG_IN.

In general, an image capture system may include a capture unit and an image signal processor (ISP). The ISP is used for perform various image processing operations, including image scaling, image stabilization, automatic white balance, etc., upon an image output of the capture unit. In a first exemplary implementation, the capture unit is implemented in the image capture apparatus 101, and the ISP is external to the image capture apparatus 101 and has the processing circuit 102 integrated therein. Hence, the input image IMG_IN is an image output of the capture unit, and the first preview image IMG_P1 and the second preview image IMG_P2 are two image outputs of the ISP. Besides, no matter whether the image output of the image capture apparatus 101 is to serve as a preview image or a captured image, the image capture apparatus 101 performs the same capture operation. The image capture apparatus 101 may be regarded as operate under a capture mode when the preview system 100 is active.

In a second exemplary implementation, the capture unit and the ISP are both implemented in the same image capture apparatus 101. Hence, the input image IMG_IN is an image output of the ISP. In a case where the image processing operation performed by the image capture apparatus 101 for generating a preview image is different from the image processing operation performed by the image capture apparatus 101 for generating a captured image, the image capture apparatus 101 maybe regarded as operating under a preview mode when the preview system 100 is active. In another case where the image processing operation performed by the image capture apparatus 101 for generating a preview image is identical to the image processing operation performed by the image capture apparatus 101 for generating a captured image, the image capture apparatus 101 may be regarded as operating under a capture mode when the preview system 100 is active.

In a third exemplary implementation, the capture unit and a portion of the ISP are both implemented in the image capture apparatus 101, and a remaining portion of the ISP may have the processing circuit 102 integrated therein. Hence, the input image IMG_IN is an intermediate image output of the ISP, and the first preview image IMG_P1 and the second preview image IMG_P2 are two final image outputs of the ISP. In a case where the image processing operation performed by the image capture apparatus 101 for generating an intermediate preview image is different from the image processing operation performed by the image capture apparatus 101 for generating an intermediate captured image, the image capture apparatus 101 may be regarded as operating under a preview mode when the preview system 100 is active. In another case where the image processing operation performed by the image capture apparatus 101 for generating an intermediate preview image is identical to the image processing operation performed by the image capture apparatus 101 for generating an intermediate captured image, the image capture apparatus 101 may be regarded as operating under a capture mode when the preview system 100 is active.

To put is simply, the input image IMG_IN may be an image output of the capture unit or at least a portion (i.e., part or all) of the ISP, depending upon an actual design of the image capture apparatus 101. However, this is for illustrative purposes only. In practice, no matter how the image capture apparatus 101 generates the input image IMG_IN, any preview system using the proposed multi-preview scheme (e.g., the dual-preview scheme) falls within the scope of the present invention. That is, the present invention has no limitation on the source of the input image IMG_IN.

For clarity and simplicity, it is assumed that the image capture apparatus 101 mentioned hereinafter has the aforementioned capture unit and ISP, and operates under a preview mode when the preview system 100 is active.

In one exemplary design, the first preview image IMG_P1 may be generated by directly scaling the full-size input image IMG_IN to meet a display resolution requirement. In another exemplary design, the first preview image IMG_P1 may be generated by cropping the full-size input image IMG_IN to obtain a cropped image and then scaling the cropped image to meet a display resolution requirement. In short, the first preview image IMG_P1 is intended to give the user an overview of image contents to be captured by the image capture apparatus 101 under a capture mode (e.g., a photo mode).

Regarding the second preview image IMG_P2, it is generated based on a selected portion of the input image IMG_IN, where the selected portion is only a portion of the input image IMG_IN. In one exemplary design, the selected portion of the input image IMG_IN may be used as the second preview image IMG_P2 directly. That is, no additional scaling is applied to the selected portion of the input image IMG_IN. In another exemplary design, the second preview image IMG_P2 maybe generated by scaling (i.e., down-scaling or up-scaling) the selected portion of the input image IMG_IN. In short, compared to the first preview image IMG_P1, the second preview image IMG_P2 is intended to give the user a detailed view of a portion of image contents to be captured by the image capture apparatus 101 under the capture mode (e.g., the photo mode). Hence, with help of the second preview image IMG_P2, the user can exactly know what detail in a region of interest is going to be captured.

In a case where the first preview image IMG_P1 is generated by directly scaling the full-size input image IMG_IN, the selected portion of the input image IMG_IN may be defined to correspond to a portion of the input image IMG_IN. In another case where the first preview image IMG_P1 is generated by scaling a cropped image extracted from the full-size input image IMG_IN, the selected portion of the input image IMG_IN may be defined to correspond to a portion of the cropped image. To put it simply, the second preview image IMG_P2 may be a subset of the first preview image IMG_P1 in terms of image content. However, this is for illustrative purposes only, and is not meant to be a limitation of the present invention.

The selected portion of the input image IMG_IN may be determined by the processing circuit 102 automatically without user interaction. For example, the processing circuit 102 may perform face detection upon the input image IMG_IN, and automatically determine an image region, including at least one detected human face, as the selected portion of the input image IMG_IN. For another example, the processing circuit 102 may automatically use a central region or a complex texture region of the input image IMG_IN as the selected portion of the input image IMG_IN.

Alternatively, the selected portion of the input image IMG_IN may be determined by the processing circuit 102 in response to a user input USER_IN. For example, the user input USER_IN is a touch focus input which decides a focus region. Hence, an image region of the input image IMG_IN that corresponds to the focus region selected by the user input USER_IN is used as the selected portion of the input image IMG_IN. For another example, the user input USER_IN is an image region selection command. Hence, a user-defined region of the input image IMG_IN that is selected by the user input USER_IN is used as the selected portion of the input image IMG_IN.

Regarding the display apparatus 104 shown in FIG. 1, it is arranged for displaying at least the first preview image IMG_P1 and the second preview image IMG_P2, concurrently. In other words, a dual-preview output may be presented at the display apparatus 104 for allowing the user to perceive an overview of an image to be captured (i.e., the first preview image IMG_P1) as well as a detailed view of a local region within the image to be captured (i.e., the second preview image IMG_P2).

Figure 2:
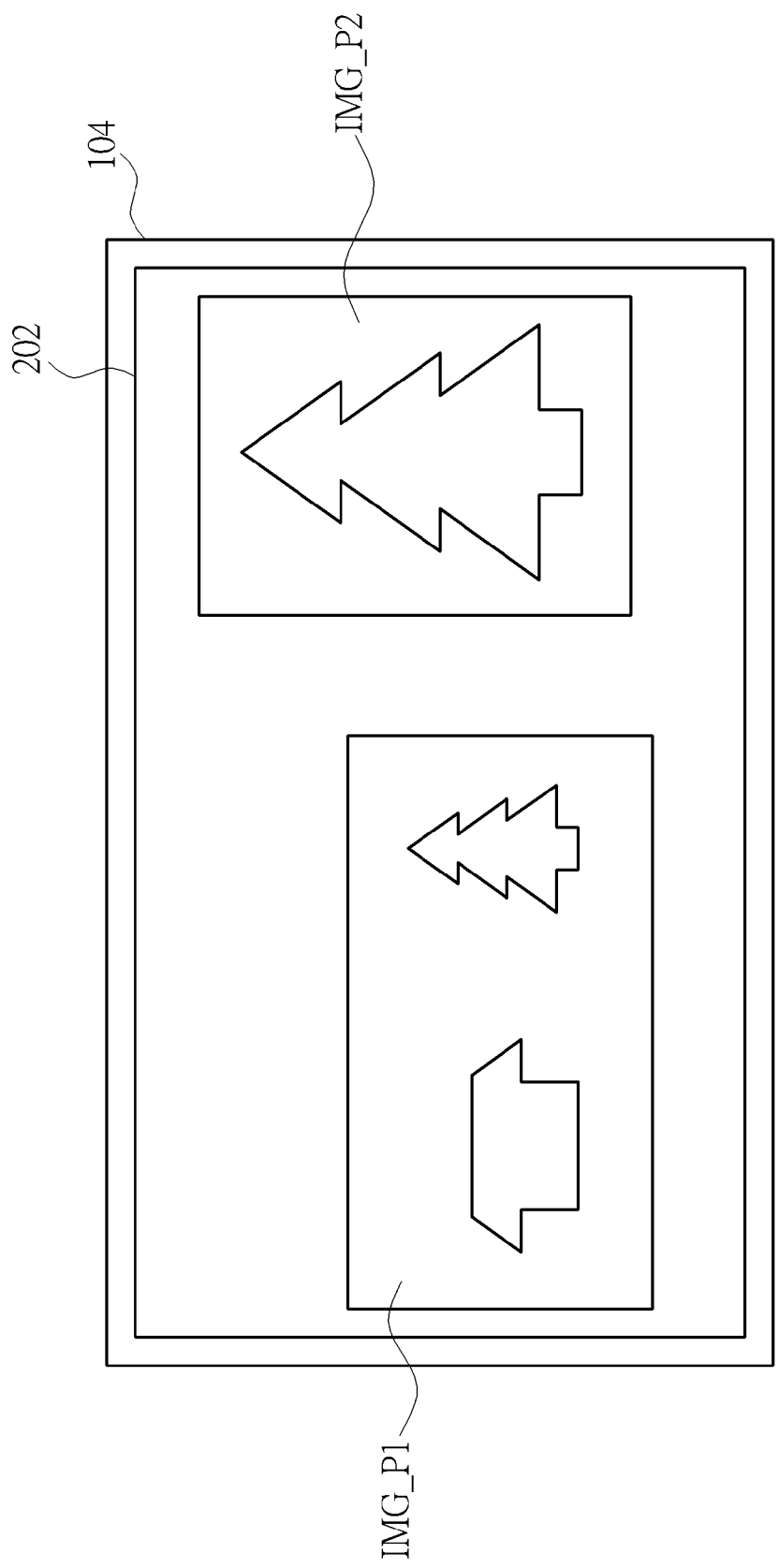
FIG. 2 is a diagram illustrating a dual-preview output presented at a display apparatus according to a first embodiment of the present invention.
Figure 3:
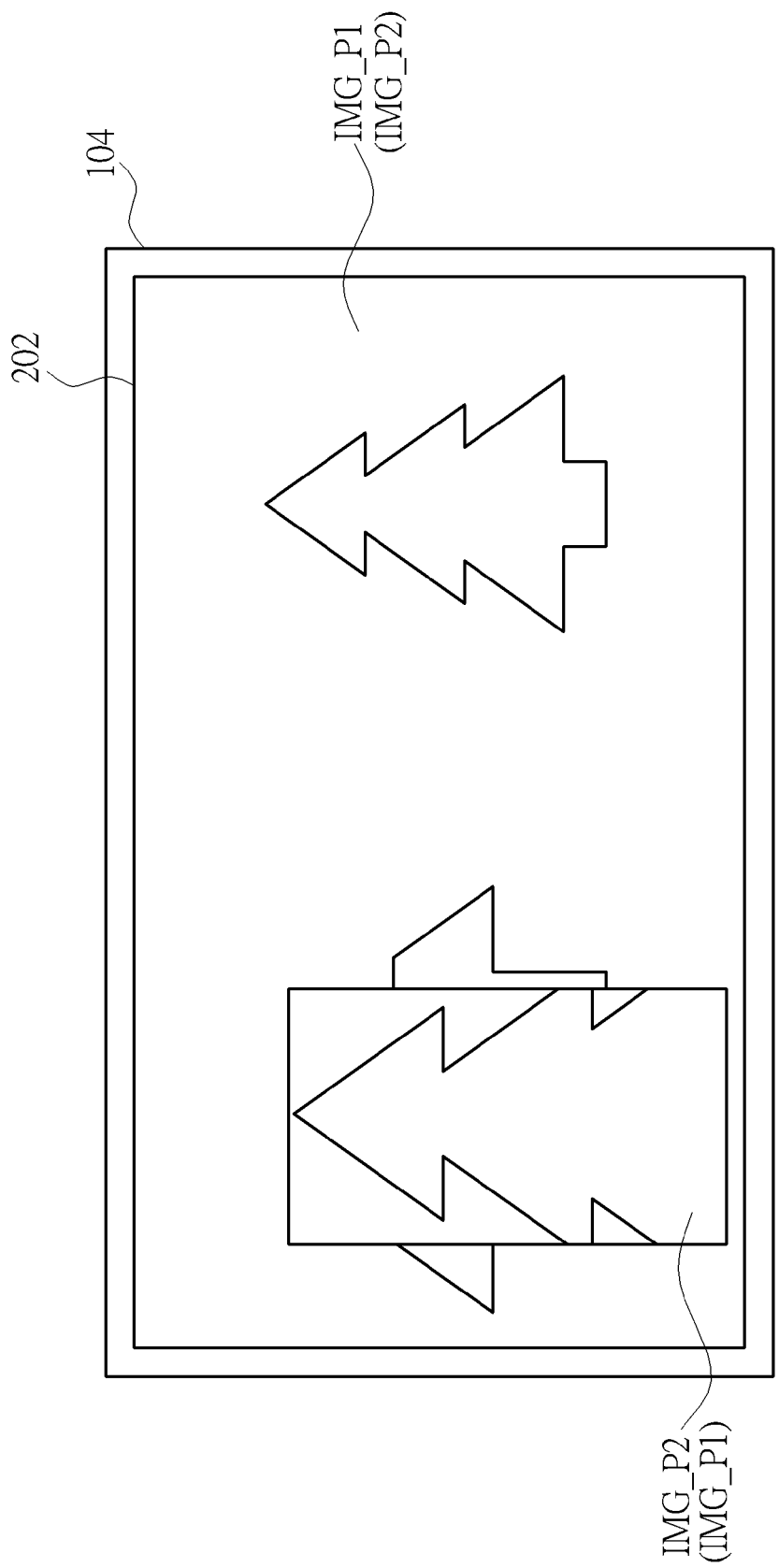
FIG. 3 is a diagram illustrating a dual-preview output presented at the display apparatus according to a second embodiment of the present invention.
Figure 4:
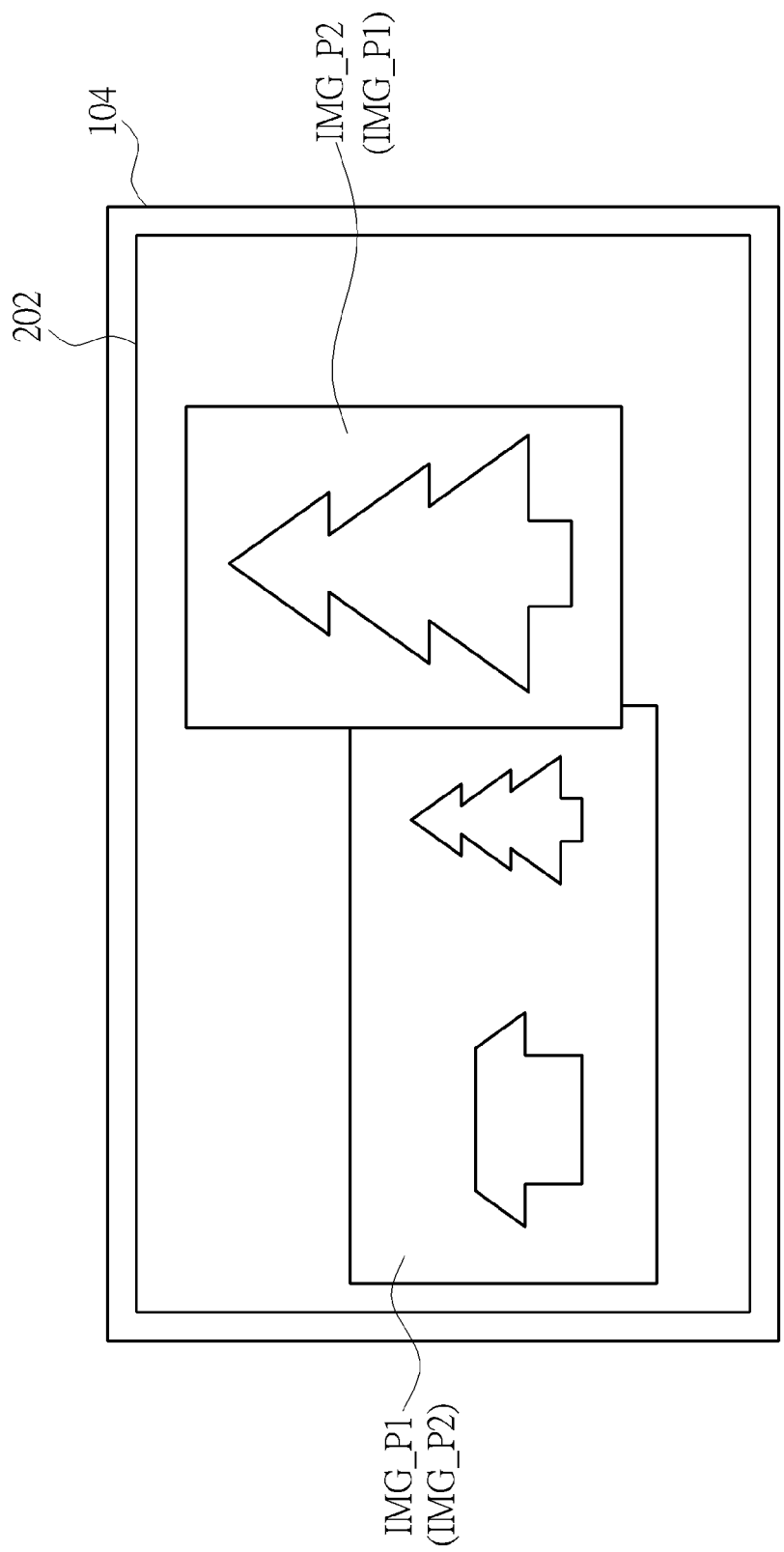
FIG. 4 is a diagram illustrating a dual-preview output presented at the display apparatus according to a third embodiment of the present invention.

In one exemplary design, the display apparatus 104 may have a single display screen only. Please refer to FIG. 2, which is a diagram illustrating a dual-preview output presented at the display apparatus 104 according to a first embodiment of the present invention. As shown in FIG. 2, the first preview image IMG_P1 and the second preview image IMG_P2 are displayed on the display screen 202 in a picture outside picture (POP) manner. In other words, each of the first preview image IMG_P1 and the second preview image IMG_P2 is fully displayed without any overlapped display area. Please refer to FIG. 3, which is a diagram illustrating a dual-preview output presented at the display apparatus 104 according to a second embodiment of the present invention. As shown in FIG. 3, the first preview image IMG_P1 and the second preview image IMG_P2 are displayed on the display screen 202 in a picture in picture (PIP) manner. In other words, one of the first preview image IMG_P1 and the second preview image IMG_P2 is fully overlaid on the other of the first preview image IMG_P1 and the second preview image IMG_P2. For example, the second preview image IMG_P2 may be overlaid on the first preview image IMG_P1. Alternative, the first preview image IMG_P1 may be overlaid on the second preview image IMG_P2. Please refer to FIG. 4, which is a diagram illustrating a dual-preview output presented at the display apparatus 104 according to a third embodiment of the present invention. As shown in FIG. 4, the first preview image IMG_P1 and the second preview image IMG_P2 are displayed on the display screen 202 in a partial overlay manner. In other words, a portion of one of the first preview image IMG_P1 and the second preview image IMG_P2 is overlaid on the other of the first preview image IMG_P1 and the second preview image IMG_P2. For example, the second preview image IMG_P2 may be only partially overlaid on the first preview image IMG_P1. Alternatively, the first preview image IMG_P1 may be only partially overlaid on the second preview image IMG_P2.

Figure 5:
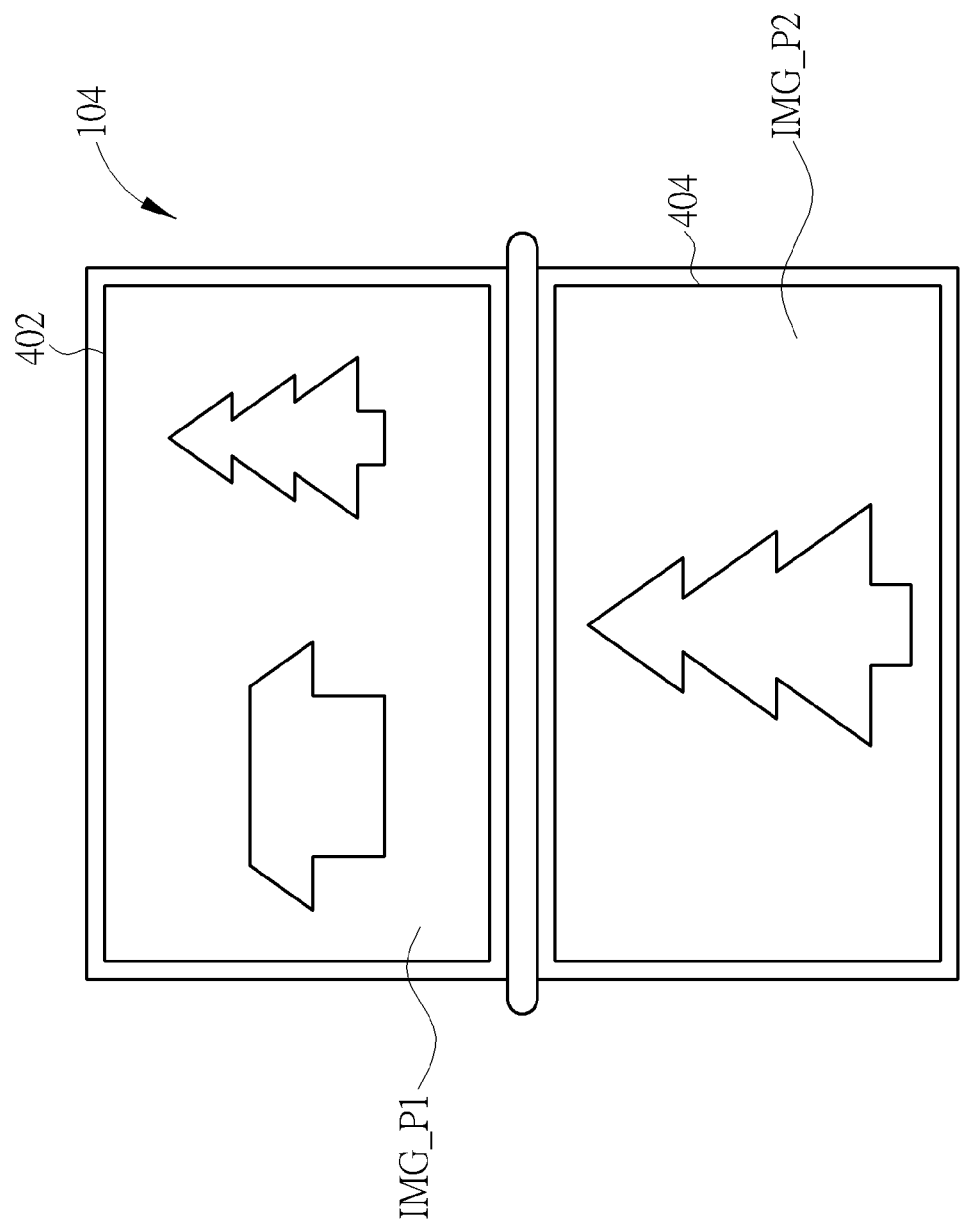
FIG. 5 is a diagram illustrating a dual-preview output presented at the display apparatus according to a fourth embodiment of the present invention.

In another exemplary design, the display apparatus 104 may have more than one display screen. Please refer to FIG. 5, which is a diagram illustrating a dual-preview output presented at the display apparatus 104 according to a fourth embodiment of the present invention. In this embodiment, the display apparatus 104 has a plurality of separate display screens, including a first display screen 402 and a second display screen 404. Therefore, the first preview image IMG_P1 may be displayed on one of the first display screen 402 and the second display screen 404, and the second preview image IMG_P2 may be displayed on the other of the first display screen 402 and the second display screen 404. As shown in FIG. 5, the first preview image IMG_P1 is displayed on the first display screen 402, while the second preview image IMG_P2 is displayed on the second display screen 404.

Figure 6:
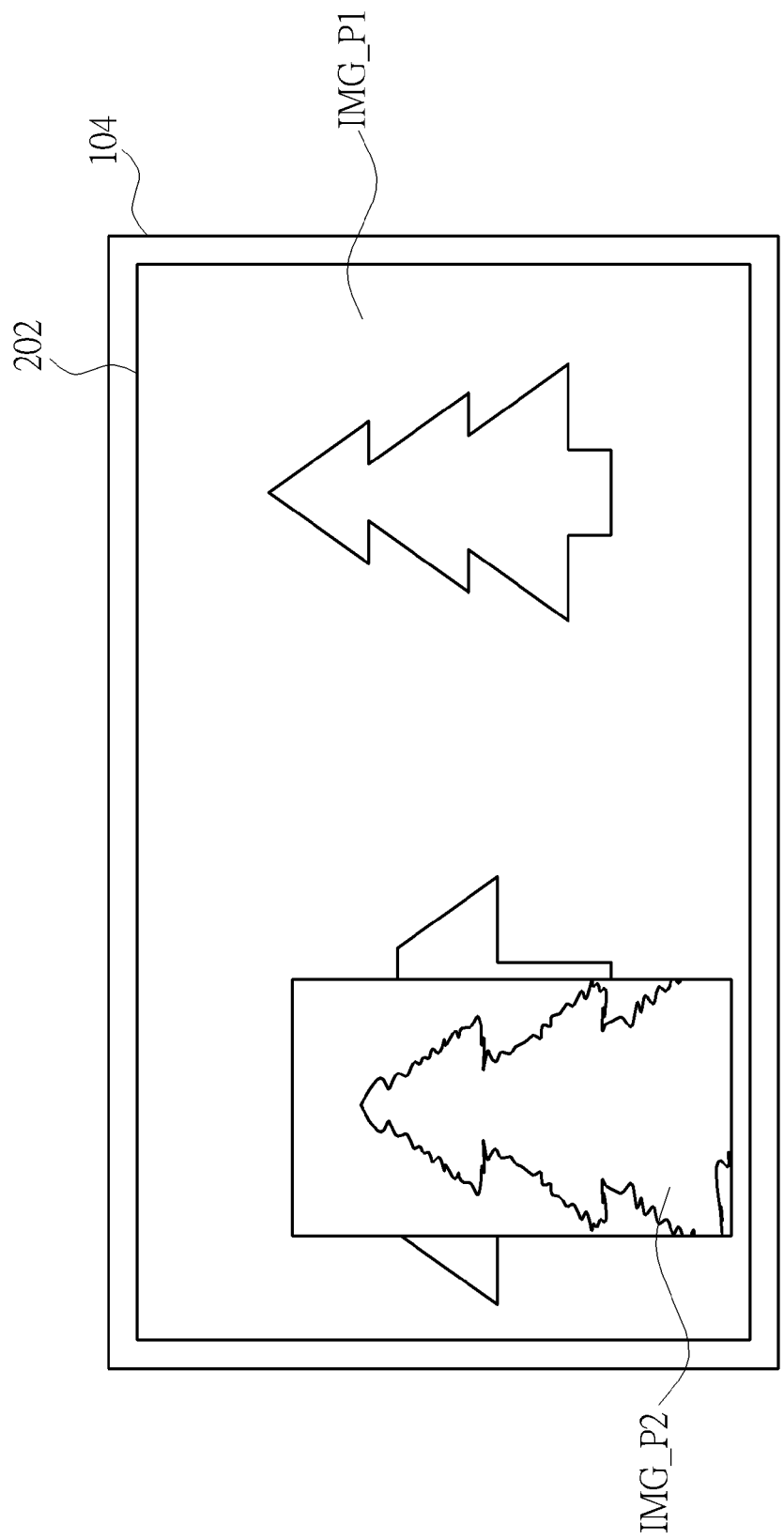
FIG. 6 is a diagram illustrating a dual-preview output presented at the display apparatus according to a fourth embodiment of the present invention.

The second preview image IMG_P2 can assist the user to exactly know what detail will be captured after user's finger touches/presses and then leaves a physical/virtual capture button 110 of the image capture apparatus 101. Please refer to FIG. 3 in conjunction with FIG. 6. FIG. 6 is a diagram illustrating a dual-preview output presented at the display apparatus 104 according to a fourth embodiment of the present invention. As shown in FIG. 6, the second preview image IMG_P2 is fully overlaid on the first preview image IMG_P1. However, user' s hand may be unstable when holding a portable device equipped with image capture functionality (e.g., a smartphone equipped with a camera module, or a digital camera) . Hence, the image capture apparatus 101 operating under the preview mode is affected by undesired hand shake. Consider an exemplary case where the display resolution of the display screen 202 is lower than the camera resolution of the image capture apparatus 101, the first preview image IMG_P1 is generated by downscaling the full-size input image IMG_IN, and the second preview image IMG_P2 is directly set by a selected portion extracted from the input image IMG_IN. When both of the first preview image IMG_P1 and the second preview image IMG_P2 are displayed on the display screen 202 in the PIP manner, the second preview image IMG_P2 may be regarded as a zoom-in version of a portion of the first preview image IMG_P1. As the first preview image IMG_P1 is a down-scaled version of the input image IMG_IN, the image blurring which is caused by the hand shake and presented in the input image IMG_IN is also down-scaled. As a result, the first preview image IMG_P1 shown on the lower-resolution display screen 202 would look clear even though the higher-resolution input image IMG_IN is actually blurry. Therefore, based on the image quality of the first preview image IMG_P1, the user may misjudge that the image quality of a captured image captured by the image capture apparatus 101 under the capture mode (e.g., the photo mode) would be fine.

To let the user know what detail will be actually captured, the present invention therefore proposes displaying another preview image (i.e., the second preview image IMG_P2). As mentioned above, the second preview image IMG_P2 is a zoom-in version of a portion of the first preview image IMG_P1. Hence, when the second preview image IMG_P2 is cropped from the input image IMG_IN without downscaling, the image blurring which is caused by the hand shake and presented in the input image IMG_IN would retain in the second preview image IMG_P2. Besides, when the second preview image IMG_P2 is cropped from the input image IMG_IN that is slightly down-scaled or slightly up-scaled, the image blurring which is caused by the hand shake and presented in the input image IMG_IN would still be noticeable in the second preview image IMG_P2. In this way, the user can refer to the second preview image IMG_P2 to easily know that the image quality of a captured image captured by the image capture apparatus 101 under the capture mode (e.g., the photo mode) would be poor. When user's hand is stable, no hand shake is applied to the portable device equipped with image capture functionality (e.g., a smartphone equipped with a camera module, or a digital camera). At this moment, the second preview image IMG_P2 looks clear due to the fact that the input image IMG_IN is free of the undesired image blurring caused by hand shake, as shown in FIG. 3. Based on the second preview image IMG_P2 shown in FIG. 3, the user may touch/press and then leave the physical/virtual capture button 110 to trigger the image capture apparatus 101 to enter the capture mode for generating a capture image as desired.

The camera shake magnitude and/or shake direction may be calculated based on motion estimation performed by the processing circuit 102, or maybe derived from information given by other sensors such as a G-sensor, a Gyro sensor, etc. The processing circuit 102 may further add a visual indication of the camera shake magnitude and/or shake direction to the second preview image IMG_P2. In this way, when the second preview image IMG_P2 is displayed, the visual indication of the camera shake magnitude and/or shake direction is also displayed to notify the user that user's hand is not stable yet.

The display sizes of the first preview image IMG_P1 and the second preview image IMG_P2 may be fixed under the preview mode. However, this is for illustrative purposes only, and is not meant to be a limitation of the present invention. For example, before the capture button 110 of the image capture apparatus 101 is touched/pressed, a display size of the first preview image IMG_P1 is larger than a display size of the second preview image IMG_P2, where the display size of the second preview image IMG_P2 may be a zero value (i.e., the second preview image IMG_P2 is not displayed) or a non-zero value (i.e., the second preview image IMG_P2 is displayed). However, while the capture button 110 is being touched/pressed (i.e., the capture button 110 is touched/pressed but not released yet), the display size of the second preview image IMG_P2 is increased, and the display size of the first preview image IMG_P1 is reduced or unchanged. For example, the display size of the first preview image IMG_P1 is smaller than the display size of the second display screen IMG_P2, and the first preview image IMG_P1 and the second preview image IMG_P2 with different display sizes are concurrently displayed. When the capture button 110 is being touched/pressed by user's finger, this means that the user is going to use the image capture apparatus 101 to obtain a captured image. More specifically, when user's finger leaves the capture button 110 to release the capture button 110, the image capture apparatus 101 leaves the preview mode and enters the capture mode (e.g., the photo mode) such that a captured image is generated in response to user's control. Therefore, before the image capture apparatus 101 enters the capture mode, the processing circuit 102 may be configured to control the image display of the first preview image IMG_P1 and the second display screen IMG_P2 on the display apparatus 104 to increase the display size of the second display screen IMG_P2. As the second display screen IMG_P2 is shown in a larger display area when the capture button 110 is being touched/pressed, this helps the user to more clearly and easily know what detail will be captured, thus enhancing user experience of using the portable device (e.g., a smartphone or a digital camera) to take pictures.

For better understanding of technical features of controlling the display size of the second display screen IMG_P2, several examples are given as below.

Figure 7:
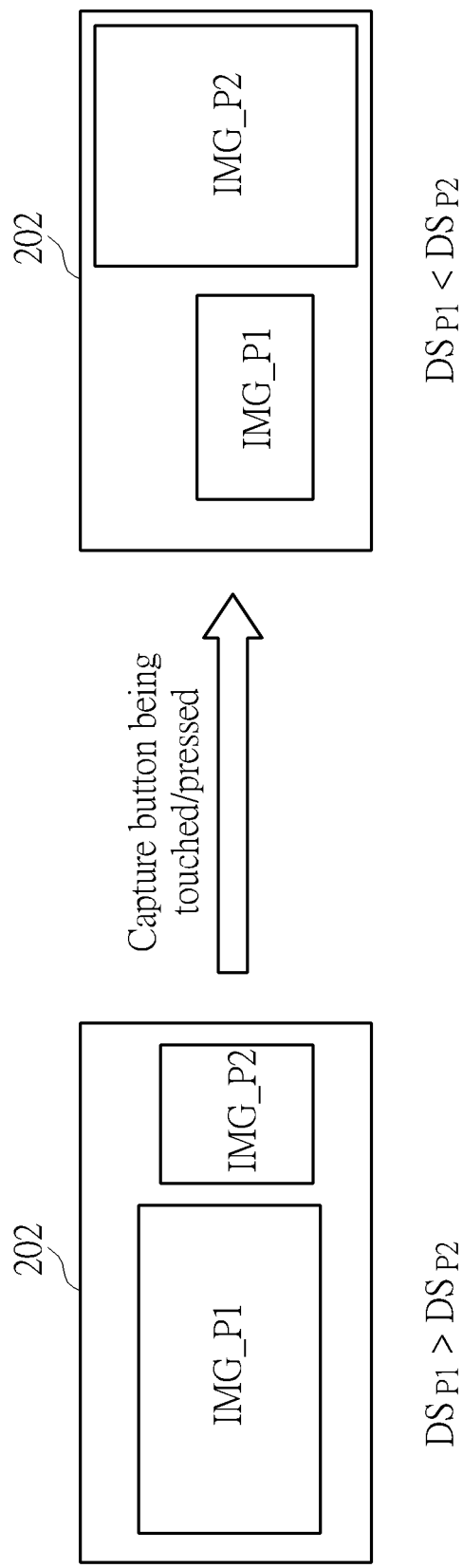
FIG. 7 is a diagram illustrating variation of display sizes of the first preview image and the second preview image according to a first embodiment of the present invention.

FIG. 7 is a diagram illustrating variation of display sizes of the first preview image IMG_P1 and the second preview image IMG_P2 according to a first embodiment of the present invention. In this embodiment, the first preview image IMG_P1 and the second preview image IMG_P2 are displayed on the display screen 202 in a POP manner. As can be seen from FIG. 7, the display size $DS_{P_1}$ of the first preview image IMG_P1 is larger than the display size $DS_{P_2}$ of the second preview image IMG_P2 before the capture button 110 of the image capture apparatus 101 is touched/ pressed. That is, the second preview image IMG_P2 is displayed in a smaller display area. By way of example, but not limitation, the size of the aforementioned selected portion of the input image IMG_IN may be smaller due to the fact that a smaller display area is available for displaying the second preview image IMG_P2.

However, while the capture button 110 is being touched/pressed, the display size $DS_{P1}$ of the first preview image IMG_P1 is smaller than the display size $DS_{P2}$ of the second display screen IMG_P2. That is, the second preview image IMG_P2 is displayed in a larger display area. By way of example, but not limitation, the size of the aforementioned selected portion of the input image IMG_IN may be larger due to the fact that a larger display area is available for displaying the second preview image IMG_P2.

In this example, the display size $DS_{P2}$ is a non-zero value before the capture button is touched/pressed, and the display size $DS_{P1}$ is reduced when the capture button is touched/pressed. Alternatively, the display size $DS_{P2}$ may be a zero value before the capture button is touched/pressed, and/or the display size $DS_{P1}$ may be unchanged when the capture button is touched/pressed.

Figure 8:
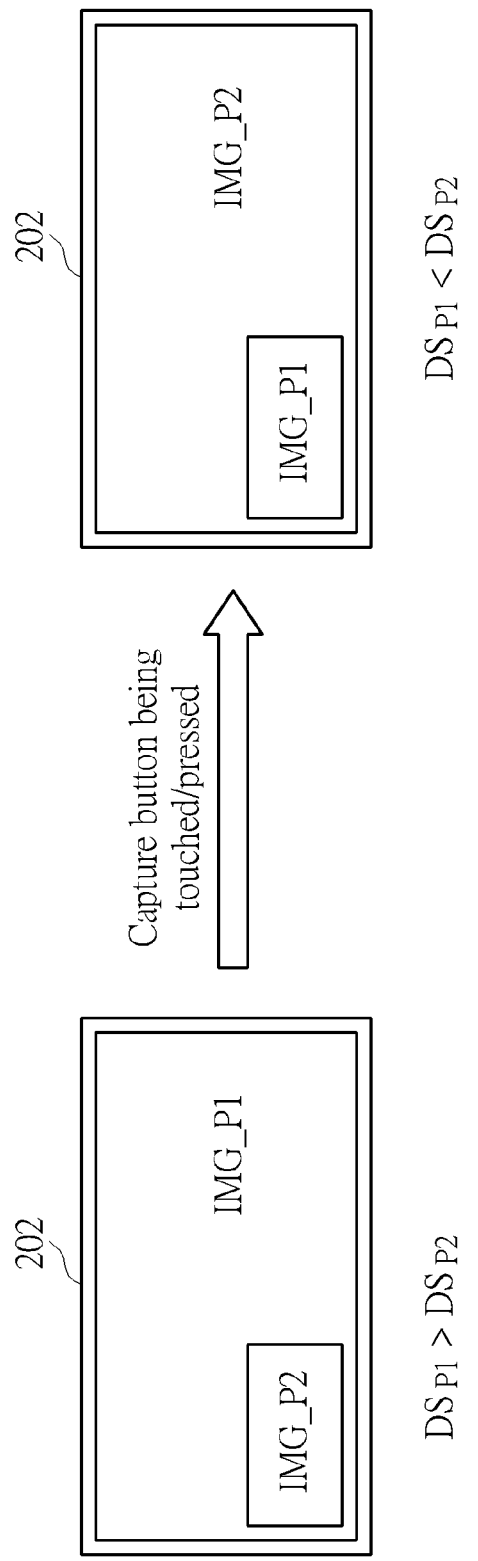
FIG. 8 is a diagram illustrating variation of display sizes of the first preview image and the second preview image according to a second embodiment of the present invention.

FIG. 8 is a diagram illustrating variation of display sizes of the first preview image IMG_P1 and the second preview image IMG_P2 according to a second embodiment of the present invention. In this embodiment, the first preview image IMG_P1 and the second preview image IMG_P2 are displayed on the display screen 202 in a PIP manner. Before the capture button 110 of the image capture apparatus 101 is touched/pressed, the first preview image IMG_P1 may act as a background image, and the second preview image IMG_P2 may act as a foreground image. As can be seen from FIG. 8, the display size $DS_{P1}$ of the first preview image IMG_P1 is larger than the display size $DS_{P2}$ of the second preview image IMG_P2. That is, the second preview image IMG_P2 is displayed in a smaller display area. By way of example, but not limitation, the size of the aforementioned selected portion of the input image IMG_IN may be smaller due to the fact that a smaller display area is available for displaying the second preview image IMG_P2.

However, while the capture button 110 is being touched/pressed, the first preview image IMG_P1 may act as a foreground image, and the second preview image IMG_P2 may act as a background image. As shown in FIG. 8, the display size $DS_{P1}$ of the first preview image IMG_P1 is smaller than the display size $DS_{P2}$ of the second display screen IMG_P2. That is, the second preview image IMG_P2 is displayed in a larger display area. By way of example, but not limitation, the size of the aforementioned selected portion of the input image IMG_IN may be larger due to the fact that a larger display area is available for displaying the second preview image IMG_P2.

In this example, the display size $DS_{P2}$ is a non-zero value before the capture button is touched/pressed, and the display size $DS_{P1}$ is reduced when the capture button is touched/pressed. Alternatively, the display size $DS_{P2}$ may be a zero value before the capture button is touched/pressed, and/or the display size $DS_{P1}$ may be unchanged when the capture button is touched/pressed.

Figure 9:
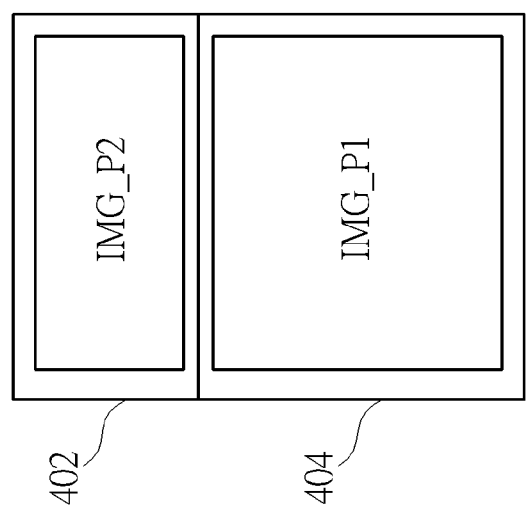
FIG. 9 is a diagram illustrating variation of display sizes of the first preview image and the second preview image according to a third embodiment of the present invention.
Figure 9:
Figure 9:
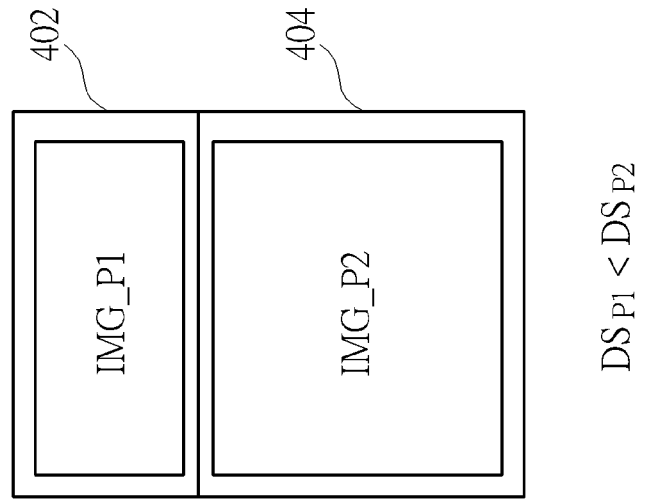

FIG. 9 is a diagram illustrating variation of display sizes of the first preview image IMG_P1 and the second preview image IMG_P2 according to a third embodiment of the present invention. In this embodiment, the first preview image IMG_P1 and the second preview image IMG_P2 are displayed on different display screens. Before the capture button 110 of the image capture apparatus 101 is touched/pressed, the first preview image IMG_P1 is displayed on the display screen 404 with a larger display area, and the second preview image IMG_P2 is displayed on the display screen 402 with a smaller display area. As can be seen from FIG. 9, the display size $DS_{P1}$ of the first preview image IMG_P1 is larger than the display size $DS_{P2}$ of the second preview image IMG_P2. By way of example, but not limitation, the size of the aforementioned selected portion of the input image IMG_IN may be smaller due to the fact that a smaller display area is available for displaying the second preview image IMG_P2.

However, while the capture button 110 is being touched/pressed, the first preview image IMG_P1 is displayed on the display screen 402 with a smaller display area, and the second preview image IMG_P2 is displayed on the display screen 404 with a larger display area. As can be seen from FIG. 9, the display size $DS_{P1}$ of the first preview image IMG_P1 is smaller than the display size $DS_{P2}$ of the second display screen IMG_P2. By way of example, but not limitation, the size of the aforementioned selected portion of the input image IMG_IN may be larger due to the fact that a larger display area is available for displaying the second preview image IMG_P2.

Figure 10:
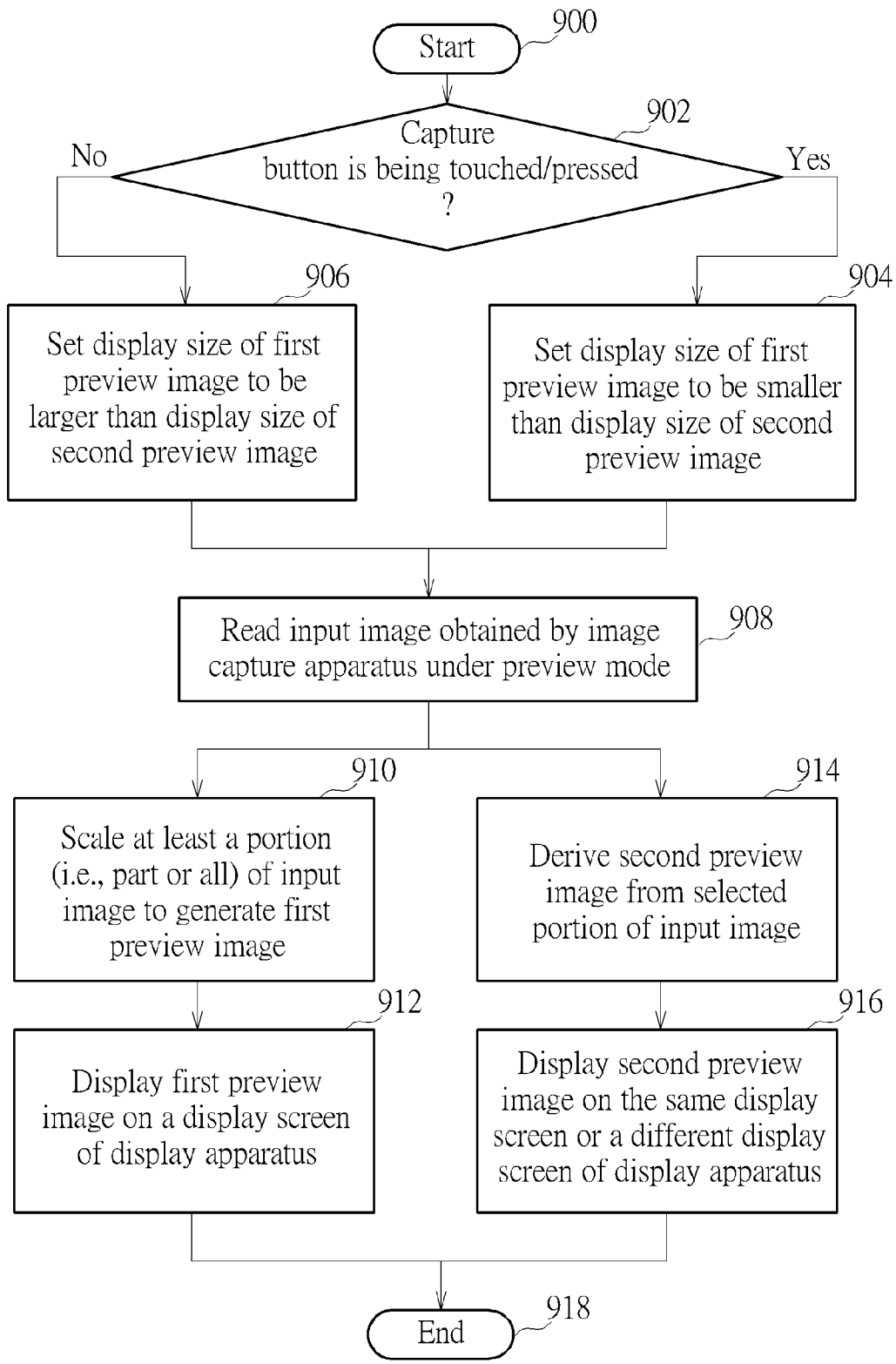
FIG. 10 is a flowchart illustrating a preview method for an image capture apparatus according to an embodiment of the present invention.

FIG. 10 is a flowchart illustrating a preview method for an image capture apparatus according to an embodiment of the present invention. The preview method may be employed by the preview system 100 shown in FIG. 1, and can be briefly summarized as below. Provided that the result is substantially the same, the steps are not required to be executed in the exact order shown in FIG. 10.

Step 900: Start.

Step 902: Check if the capture button 110 of the image capture apparatus 101 is being touched/pressed. If yes, go to step 904; otherwise, go to step 906.

Step 904: Set the display size of the first preview image IMG_P1 to be smaller than the display size of the second preview image IMG_P2. Go to step 908.

Step 906: Set the display size of the first preview image IMG_P1 to be larger than the display size of the second preview image IMG_P2.

Step 908: Read the input image IMG_IN obtained by the image capture apparatus 101 under the preview mode. Go to steps 910 and 914.

Step 910: Scale at least a portion (i.e., part or all) of the input image IMG_IN to generate the first preview image IMG_P1.

Step 912: Display the first preview image IMG_P1 on a display screen of the display apparatus 104. Go to step 918.

Step 914: Derive the second preview image IMG_P2 from a selected portion of the input image IMG_IN, wherein the selected portion may be determined automatically without user intervention or determined in response to the user input USER_IN.

Step 916: Display the second preview image on the same display screen or a different display screen of the display apparatus.

Step 918: End.

As a person skilled in the art can readily understand details of each step shown in FIG. 10 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A preview system of an image capture apparatus, comprising:
   a processing circuit, arranged for reading an input image, scaling at least a portion of the input image to generate a first preview image, and deriving a second preview image from a selected portion of the input image; and
   a display apparatus, arranged for displaying the first preview image and the second preview image, concurrently;
   wherein each of the first preview image and the second preview image is displayed while a trigger signal is generated by an input device of the image capture apparatus; when the trigger signal indicates a first status, a first mode is active; when the trigger signal indicates a second status following the first status, a second mode is active; and each of the first preview image and the second preview image is displayed during the first mode; and
   wherein when the trigger signal is not generated and none of the first mode and the second mode is active, the first preview image and the second preview image are both displayed on the display apparatus with a display size of the first preview image being larger than a display size of the second preview image; and while the trigger signal is generated to indicate the first status, the display size of the second preview image is increased under the first mode.

2. The preview system of claim 1, wherein the trigger signal is generated by the input device of the image capture apparatus when the input device is being operated.

3. The preview system of claim 1, wherein the trigger signal is generated by the input device of the image capture apparatus when the input device is being touched or pressed.

4. The preview system of claim 1, wherein:
   the trigger signal to indicate the first status is generated by the input device of the image capture apparatus when a first element of the input device is being operated, and
   the trigger signal to indicate the second status is generated by the input device of the image capture apparatus when a second element of the input device is being operated, wherein the first element and the second element corresponds to a same function provided by the image capture apparatus.

5. The preview system of claim 1, wherein:
   the trigger signal to indicate the first status is generated by the input device of the image capture apparatus when a first operation to the input device is performed, and
   the trigger signal to indicate the second status is generated by the input device of the image capture apparatus when a second operation to the input device is performed, wherein the first operation and the second operation corresponds to a same function provided by the image capture apparatus.

6. A preview method for an image capture apparatus, comprising:
   reading an input image;
   scaling at least a portion of the input image to generate a first preview image;
   deriving a second preview image from a selected portion of the input image; and
   displaying the first preview image and the second preview image on a display apparatus, concurrently;
   wherein each of the first preview image and the second preview image is displayed while a trigger signal is generated by an input device of the image capture apparatus; when the trigger signal indicates a first status, a first mode is active; when the trigger signal indicates a second status following the first status, a second mode is active; and each of the first preview image and the second preview image is displayed during the first mode; and
   wherein when the trigger signal is not generated and none of the first mode and the second mode is active, the first preview image and the second preview image are both displayed on the display apparatus with a display size of the first preview image being larger than a display size of the second preview image; and while the trigger signal is generated to indicate the first status, the display size of the second preview image is increased under the first mode.

7. The preview method of claim 6, wherein the trigger signal is generated by the input device of the image capture apparatus when the input device is being operated.

8. The preview method of claim 6, wherein the trigger signal is generated by the input device of the image capture apparatus when the input device is being touched or pressed.

9. The preview method of claim 6, wherein:
   the trigger signal to indicate the first status is generated by the input device of the image capture apparatus when a first element of the input device is being operated, and
   the trigger signal to indicate the second status is generated by the input device of the image capture apparatus when a second element of the input device is being operated, wherein the first element and the second element corresponds to a same function provided by the image capture apparatus.

10. The preview method of claim 6, wherein:
    the trigger signal to indicate the first status is generated by the input device of the image capture apparatus when a first operation to the input device is performed, and
    the trigger signal to indicate the second status is generated by the input device of the image capture apparatus when a second operation to the input device is performed, wherein the first operation and the second operation corresponds to a same function provided by the image capture apparatus.

* * * * *